July 11, 1961    L. C. DRIEBORG    2,991,965
PALLET

Filed March 23, 1959    3 Sheets-Sheet 2

INVENTOR.
LUKE C. DRIEBORG
BY
Price and Heneveld
ATTORNEYS

July 11, 1961 L. C. DRIEBORG 2,991,965
PALLET
Filed March 23, 1959 3 Sheets-Sheet 3

INVENTOR.
LUKE C. DRIEBORG
BY
Price and Heneveld
ATTORNEYS

United States Patent Office 2,991,965
Patented July 11, 1961

2,991,965
PALLET
Luke C. Drieborg, East Grand Rapids, Mich., assignor to Mag-Craft Corporation, East Grand Rapids, Mich., a corporation of Michigan
Filed Mar. 23, 1959, Ser. No. 801,350
5 Claims. (Cl. 248—120)

This invention relates to load bearing pallets in general, and more particularly to more durable, longer life and more serviceable load bearing pallet forms.

Load bearing pallets have long been used to support work load up off the floor and to thereby enable lift means to be engaged under the pallet for transporting the pallet and its work load to different locations. Such pallets are most frequently made of inexpensive material and are constructed in a generally haphazard manner by unskilled labor. Wooden slats, nailed together, form the most commonly known pallets.

Wooden pallets are unsatisfactory for a number of reasons. First of all, they are easily damaged and often beyond repair. The wooden slats of such pallets are subject to rot and germ carrying fungus growths. The wood screws and nails used in constructing such pallets may protrude and damage packaged loads carried on the pallets. Further, the screws and nails may fall out and cause serious damage in automatic pallet transfer equipment. The weight of such pallets, especially when water logged, is appreciable and the weight is in no way reflective of the strength of the pallet. The use of inferior materials may result in a very short serviceable life for the wooden pallet.

It is an object of this invention to disclose a different type of load bearing pallet than those commonly known. The pallet form of this invention is of a material and shape that assures longer and more serviceable use.

It is an object of this invention to disclose a load bearing pallet including spaced cylindrical pedestals with interconnecting channeled webs for exceptional strength and durability.

It is also an object of this invention to disclose a pallet form which may be constructed of magnesium alloy at relatively less expense than conventional wooden pallets. The metal pallet may be heat treated to make it germ free. It is impervious to salt water. It is half again as strong as an aluminum pallet, per weight, and four times stronger than steel, per weight.

Another object of this invention is to disclose a pallet having plane surfaces, and no protrusions to interfere with loading or transfer of the pallets. The pallets also include rounded corners which make them more suitable for use with automatic transfer equipment.

Still another object of this invention is to disclose a pallet which may have slide runners, caster wheels, or the like readily attached thereto; thus making a much more versatile pallet than those commonly known.

These and other objects and advantages in the practice of this invention will be more apparent in the illustration and description of a working embodiment of the invention, as hereinafter set forth.

The pallet of this invention is formed of magnesium alloy and includes a plane surfaced load bearing platform of channel web construction. Support standards are provided under the side edges and midsection of the load bearing platform. These standards are formed by cylindrical pedestals or posts which are connected together across their base. The pallet platform and support standards are of integral construction.

Figure 1:
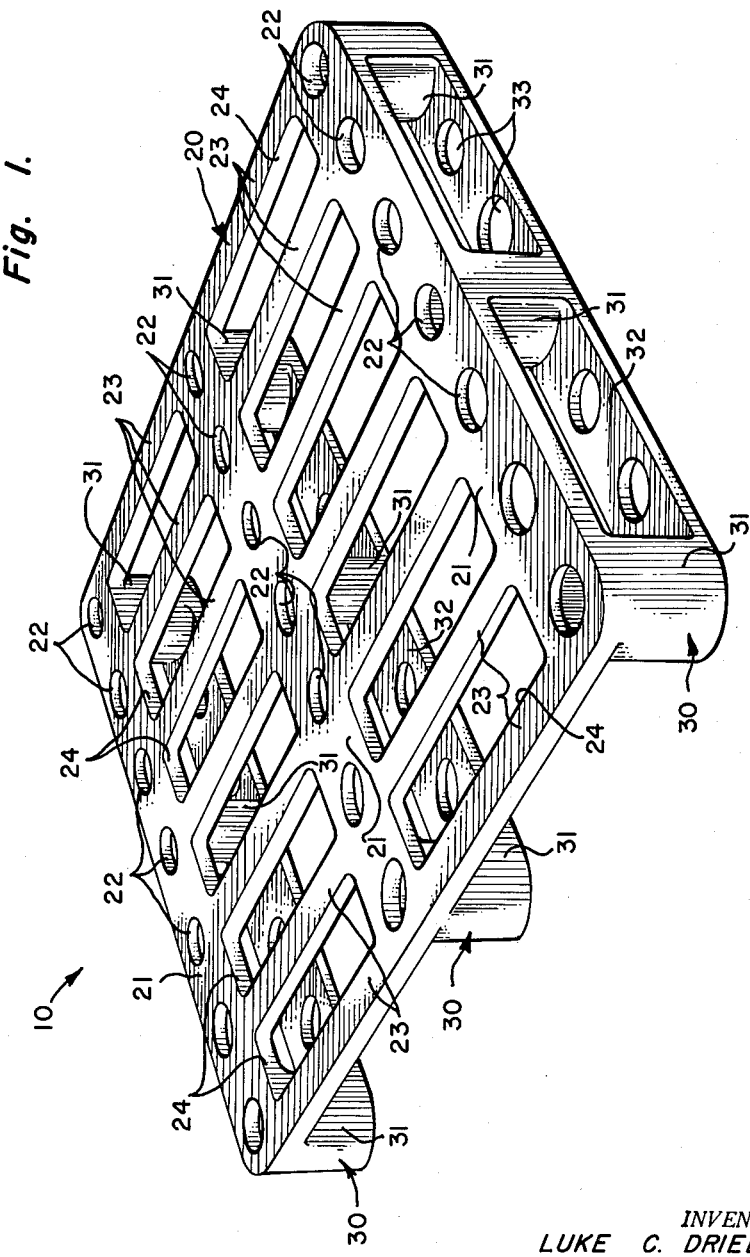
FIG. 1 is a perspective view of one form of pallet which may be made in accord with the teachings of this invention.
Figure 2:
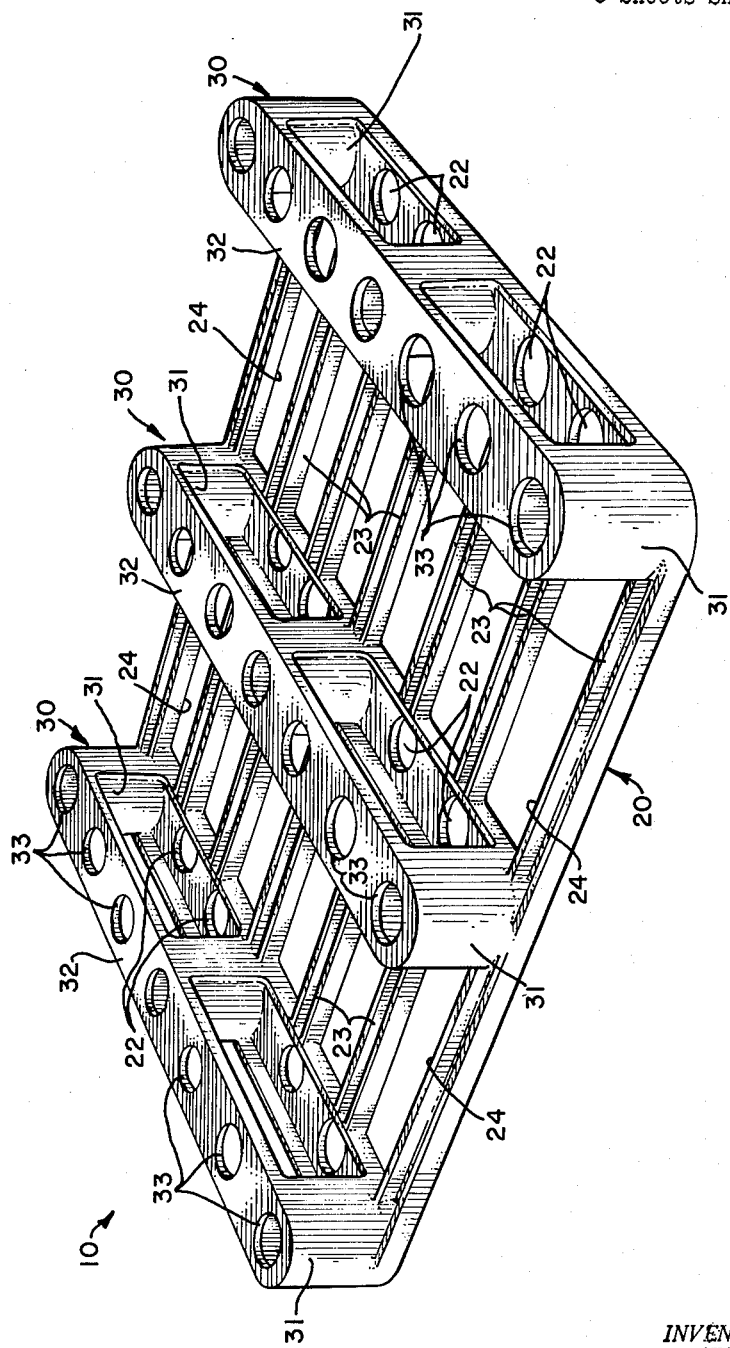
FIG. 2 is a perspective view of the underside of the pallet shown by FIG. 1.

The pallet 10 of FIGS. 1 and 2 includes a load bearing platform 20 and support standards 30.

The load bearing platform 20 is plane surfaced on its upper side and includes channel web sections 21 extending along its side edges and in parallel spaced relation thereto across its midsection. Lightening holes 22 are formed in the channel web sections. The channel web sections 21 are joined together by channel webs 23 extending across the pallet form. These latter webs 23 form a grillwork of rectangular openings 24 within the surface of the load bearing platform. Such openings 24 also serve to reduce the weight of the pallet 10.

The pallet support standards 30 are cast integral with the load bearing platform 20. The supports include cylindrical pedestals or pillar posts 31 at each end and midway therebetween. The pedestals 31 of each standard are joined together, at their base, by an interconnecting flange 32. Lightening holes 33 are provided in the flanges. These holes 33 may be aligned with the lightening holes 22 in the channel web sections 21.

Each pallet standard 30 includes an open space 34 between adjacently disposed pillar posts 31. These open spaces 34 are aligned across the pallet 10 and are receptive of the lift forks of a fork lift truck or other transfer mechanism. Similarly the spaces between the support standards 30 are also receptive of transfer or lift means. Accordingly the pallet 10 may be engaged and lifted from either of its four sides.

The cylindrical pedestals or pillar posts 31, at the ends of the outermost standards 30, provide rounded corners for the pallet form. As discussed, the rounded corners present less chance of obstruction in moving the pallet 10 about.

The pillar posts 31 are hollow and thereby avoid unnecessary weight in the pallet 10. The cylindrical or tubular form assures great strength. Further, the channel web sections 21 and the flanges 32, extending as they do across the ends of the pedestal members, serve to additionally strengthen the structure.

The lightening holes 22 and 33, in the channel webs and flanges 21 and 32, respectively, are aligned over the pedestals 31. Thus, debris will not collect in the posts and, further, fastener means for attaching slides, casters, or the like (not shown) may be extended through these openings. The lightening holes 33 in flanges 31 between the posts 31 may also be used for such latter purpose.

Figure 3:
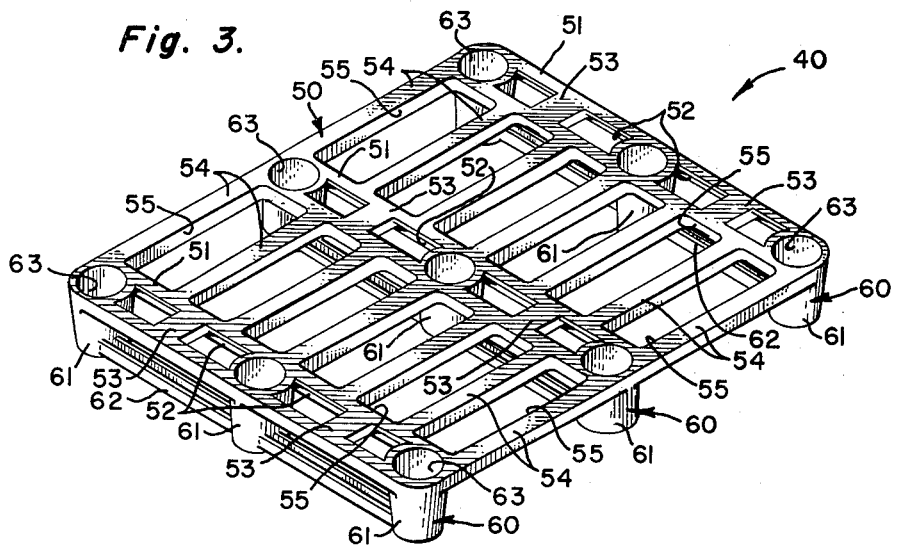
FIG. 3 is a perspective view of another pallet form which may be made in accord with the teachings of this invention.
Figure 4:
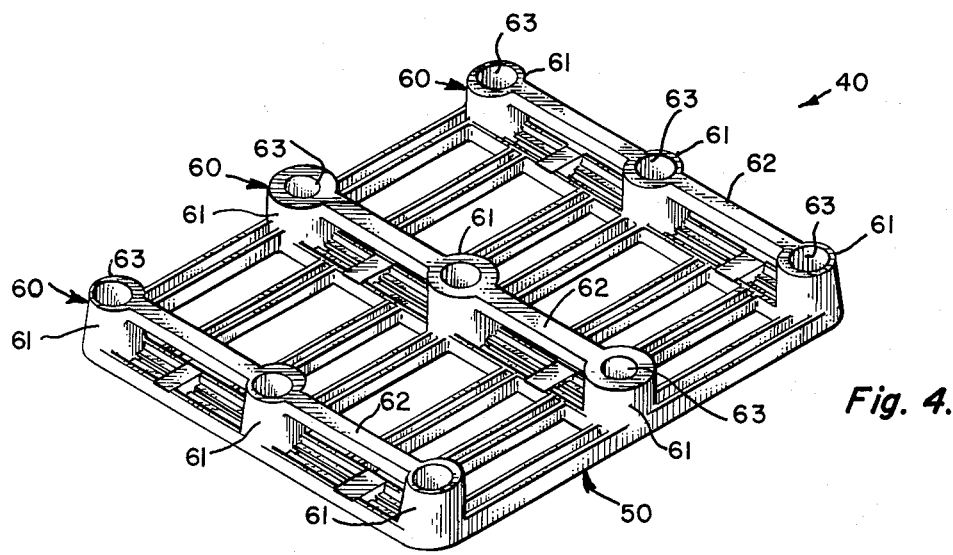
FIG. 4 is a perspective view of the underside of the pallet shown by FIG. 3.
Figure 5:
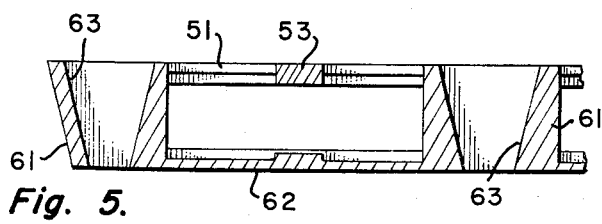
FIG. 5 is a cross sectional plan view through one of the standards of the pallet shown by FIGS. 3 and 4.

Another pallet form 40 is shown by FIGS. 3–5.

The pallet 40 includes a load bearing platform 50 with platform support standards 60 at its side edges and midsection, similar to the pallet 10.

The load bearing platform 50 includes channel section webs 51 having elongated lightening holes 52 provided therein. Ties 53 are formed across the elongated holes or slots 52 between their ends. The channel section webs 51 are provided at the side edge and across the midsection of the platform 50. They are joined together by channel webs 54 which serve to form a grillwork of rectangular openings 55 within the surface of the load bearing platform. These openings 55 and the holes or slots 52 serve to reduce the overall weight of the pallet 40.

The pallet support standards 60 are cast integral with the load bearing platform 50. The supports 60 include cylindrical pedestals or pillar posts 61 at each end and midway therebetween. The pillar posts 61 of each standard are joined together, at their bases, by a narrow channel member 62. The channel members 62 are in parallel spaced relation to the channel webs 51 and provide a space therebetween and between adjacent posts 61, for receiving suitable lift means. As in the pallet 10, lift means are also receivable between the support standards 60.

The pillar posts 61 are hollow and thereby avoid unnecessary weight in the pallet 40. Their tubular and cylindrical form assures great strength. The openings 63 through the pedestals or posts 61 are larger at their upper end than at their lower ends. This is to facilitate casting and also provides a wider base at the lower ends of the support pedestals.

The rounded shape of the support pedestals 61, at the corners of the pallet 40, present less of an obstruction in moving the pallet about. They also serve to guide lift means within the receiving spaces therefore.

The outer edges of the pedestals 61, which form the outermost support standards 60, are shown to be tapered slightly. Some weight and material saving is realized in doing this. Also, the sides of the pallet 40 are given a slight undercut which enable the pallets to be nested closer together.

The pallets 10 and 40, just described, are preferably cast of magnesium alloy. The pallets are cast as unitary articles and require no machining or finishing. They are heat treated to make them germ free. They are lightweight and impervious to weather conditions. They are stronger than other pallet forms despite their lightweight. As compared to wooden pallets they are one-fifth the weight and carry an appreciably heavier work load. They have a six to nine times more serviceable life period than wooden pallets.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

I claim:

1. A load bearing pallet, comprising; a load bearing platform having parallel spaced supports formed integral with the underside and extending under the side edges and midsection thereof, said platform including channel web sections extending in parallel spaced relation along the side edges and midsection thereof over said supports on both extremities thereof, channel webs formed integral with said channel web sections on one end of said parallel supports and extending therebetween to form an open grillwork providing said load bearing platform, and said supports including hollow cylindrical pedestals formed integral with said channel web sections and extending therebeneath, said pedestals terminating in a common plane serving as the base for said pallet said platform, supports, and web sections being an integral casting of lightweight metal.

2. A load bearing pallet, comprising; a plurality of parallel spaced support standards each including vertically disposed and parallel spaced hollow cylindrical pedestals having interconnecting web flanges connecting said pedestals together at their top and bottom edges, and a plurality of standard connecting webs disposed in coplanar parallel spaced relation for forming a load bearing platform, said connecting webs, standards, and platform being cast of lightweight metal integral with the uppermost web flanges of said standards certain of said web flanges having a plurality of apertures for reducing the weight of said pallet.

3. A cast load bearing pallet of light-weight metal, comprising; an integral load bearing platform having support standards cast integral therewith and extended in parallel spaced relation under the side edges and across the midsection thereof, said support standards each comprising vertically disposed hollow cylindrical pedestals at the ends thereof and midway therebetween, said standards collectively providing pedestals at and between the corners of said load bearing platform and centrally thereof, a perforated pedestal connecting flange formed between the terminal ends of each of the pedestals of each respective support standard for forming the base of said pallet, laterally disposed channel web sections formed over each of said support standards and integral therewith, and interconnecting channel web sections formed integral with and between each of said supoprt standards, said lateral and interconnecting channel web sections being coplanar and collectively forming said load bearing platform.

4. A cast load bearing pallet of magnesium alloy, comprising; a cast integral load bearing platform including integral cast lateral and transverse channel web sections providing a plane surfaced open grillwork platform surface, vertically disposed hollow cylindrical pedestals cast integral with said lateral channel web sections on the underside thereof, said pedestals having a core opening therethrough, and a base flange cast integral with and between the terminal ends of the pedestals of each respective lateral channel web section for forming platform supporting standards therewith, said standards having one of said pedestals at each end thereof and disposed to form rounded corners for said load bearing platform, the space between said standards and between the pedestals of said standards being receptive of parallel lift means and the cylindrical shape of said pedestals serving to guide said lift means therebetween.

5. The load bearing pallet of claim 4 having said pedestal core openings tapered towards the terminal ends thereof, and having the outer sides of said pedestals externally of said pallet sides similarly tapered towards the terminal ends thereof.

References Cited in the file of this patent

UNITED STATES PATENTS

| D. 150,031 | Richards | June 22, 1948 |
| 1,814,252 | Leary | July 14, 1931 |
| 2,468,026 | Boone | Apr. 26, 1949 |
| 2,486,284 | Horwitz | Oct. 25, 1949 |
| 2,535,528 | Brodbeck | Dec. 26, 1950 |
| 2,634,020 | Bartholomew | Apr. 7, 1953 |
| 2,698,101 | Brown | Dec. 28, 1954 |
| 2,893,588 | Martin | July 7, 1959 |
| 2,916,239 | Stopps | Dec. 8, 1959 |
| 2,922,606 | Glassman | Jan. 26, 1960 |